(12) United States Patent
Suzuki et al.

(10) Patent No.: US 11,375,359 B2
(45) Date of Patent: Jun. 28, 2022

(54) METHOD AND SYSTEM FOR MANAGING SERVICE PROVISIONING BASED ON REGISTRATION

(71) Applicant: HONDA MOTOR CO., LTD., Tokyo (JP)

(72) Inventors: Atsuyuki Suzuki, Wako (JP); Jumpei Ichinokawa, Wako (JP); Naoko Imai, Wako (JP); Ryo Saiki, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/124,849

(22) Filed: Dec. 17, 2020

(65) Prior Publication Data
US 2021/0204110 A1  Jul. 1, 2021

(30) Foreign Application Priority Data
Dec. 25, 2019 (JP) .............................. JP2019-234690

(51) Int. Cl.
*H04W 8/18* (2009.01)
*H04W 4/029* (2018.01)

(52) U.S. Cl.
CPC ............. *H04W 8/18* (2013.01); *H04W 4/029* (2018.02)

(58) Field of Classification Search
CPC ......... H04W 8/18; H04W 4/029; H04W 4/02; H04W 4/021; H04W 4/40; H04W 4/00; H04W 4/024; H04W 4/08; H04W 4/14; H04W 4/06; H04W 4/30; H04W 4/42; H04W 4/44; H04W 4/50; H04W 8/08; H04W 8/20; H04W 48/18; H04W 48/20; H04W 72/005; H04W 76/00; H04W 76/10; H04W 76/11; H04W 88/00; H04W 88/02; H04W 88/08; H04W 88/18; H04W 60/00; H04W 60/005; H04W 4/21; H04W 4/46; H04W 4/48; H04W 4/60; H04W 8/205;
(Continued)

(56) References Cited
U.S. PATENT DOCUMENTS 9,246,708 B2 *  1/2016  Rao .................... H04L 12/5865
10,517,141 B1 * 12/2019  Cona et al. .......... H04W 76/50
(Continued)

FOREIGN PATENT DOCUMENTS
JP    2006270286 A  * 10/2006
JP    2008-256674       10/2008
(Continued)

OTHER PUBLICATIONS

Japanese Office Action dated Apr. 5, 2022, with English translation, 9 pages.

*Primary Examiner* — Meless N Zewdu
(74) *Attorney, Agent, or Firm* — Rankin, Hill & Clark LLP

(57) ABSTRACT

A service provision system includes a first terminal apparatus and a second terminal apparatus that perform member registration processing, acquires a current position of a user when a member registration request is received from the user, and transmits the received member registration request to the first terminal apparatus or the second terminal apparatus, depending on whether or not the current position is within a range of a predetermined distance from a predetermined area related to provision of a service.

9 Claims, 5 Drawing Sheets

(58) Field of Classification Search
CPC ....... H04W 8/00; H04W 4/023; H04W 40/24;
H04W 40/38; H04W 48/04; G06Q
30/0631; G06Q 30/0639; G06Q 30/0645;
G06Q 50/30; G06Q 10/10; G06Q
10/0631; G06Q 30/0236; G06Q 30/0258;
G06Q 30/0261; G06Q 30/0267; G06Q
30/0266; G06Q 30/06; G06Q 30/0611;
G07F 17/0057; G07F 9/5027; G06F
16/958; G06F 16/787; G06F 16/7867;
H04L 67/2833; H04L 67/32; H04L
67/2838; H04L 67/025; H04L 67/18;
H04L 67/42; H04L 41/5051; G16Y 10/45;
G16Y 20/10; G16Y 20/40; G16Y 40/60
See application file for complete search history.

(56) References Cited

U.S. PATENT DOCUMENTS

| | | | |
|---|---|---|---|
| 2004/0049424 A1* | 3/2004 | Murray et al. | 705/14 |
| 2004/0192299 A1* | 9/2004 | Wilson et al. | 455/433 |
| 2013/0054281 A1* | 2/2013 | Thakkar et al. | 705/5 |
| 2013/0091452 A1* | 4/2013 | Sorden et al. | G06F 3/048 |
| 2016/0057579 A1* | 2/2016 | Granito et al. | H04W 4/023 |
| 2016/0292596 A1* | 10/2016 | Gaitan et al. | G06Q 10/025 |
| 2017/0091891 A1* | 3/2017 | Van Der Berg | G06Q 50/30 |
| 2018/0070208 A1* | 3/2018 | Alharayeri | H04W 4/023 |
| 2018/0211352 A1* | 7/2018 | Lim | G06Q 50/30 |
| 2019/0096021 A1* | 3/2019 | Jarvis et al. | G06Q 50/30 |
| 2019/0114732 A1* | 4/2019 | Tanabe et al. | G06Q 50/30 |
| 2019/0213513 A1* | 7/2019 | Seacat Deluca et al. G06Q 10/06311 |  |
| 2020/0065869 A1* | 2/2020 | Tiderington | G06Q 30/0284 |
| 2020/0160476 A1* | 5/2020 | Ramot et al. | G06Q 50/30 |
| 2020/0372418 A1* | 11/2020 | Hirose et al. | G06Q 10/02 |

FOREIGN PATENT DOCUMENTS

| | | |
|---|---|---|
| JP | 2009-53825 A | 3/2009 |
| JP | 2019-34684 A | 3/2019 |
| WO | 2005/083569 A1 | 9/2005 |
| WO | WO 2018161105 A1 * | 9/2018 |

* cited by examiner

METHOD AND SYSTEM FOR MANAGING SERVICE PROVISIONING BASED ON REGISTRATION

INCORPORATION BY REFERENCE

The present application claims priority under 35 U.S.C. § 119 to Japanese Patent Application No. 2019-234690 filed on Dec. 25, 2019. The content of the application is incorporated herein by reference in its entirety.

BACKGROUND OF THE INVENTION

Field of the Invention

The present invention relates to a service provision system used to provide a service to a user, and a storage medium storing a program for a mobile communication terminal used by a user in the service provision system.

Description of the Related Art

There are various services that require users to make member registration when the users use the services. In some of such services, manual confirmation work is needed when member registration is conducted. For example, in member registration for a car-sharing service, manual work is needed to confirm validity of a driver's license of a user who applies for membership.

Accordingly, in member registration requiring manual confirmation work, service providers take a time period measured in days from application for membership until completion of member registration in many cases, due to restrictions such as the number of personnel who perform member registration work and work hours.

On the other hand, to users who use a service, it is desirable that the users can use the service immediately upon making member registration when a need for the service arises, rather than that the users make member registration in advance, providing for future circumstances. For example, in a case of going additional sightseeing during a journey by using intervening hours that unexpectedly occur out of an original itinerary, it will be convenient if a user can use a shared car immediately upon making member registration for a car-sharing service when the intervening hours occur.

Conventionally, in order to facilitate use of services by allowing member registration to be easily made with a mobile communication terminal, which is harder to operate in inputting information than a terminal apparatus such as a PC (personal computer), it has been known that members can be registered separately, divided into full members who input more information at a time of registration but can use all services, and non-full members (quasi-members) who input less information at a time of registration but are subject to certain restrictions on use of the services (Japanese Patent Laid-Open No. 2007-310744). According to such a technique, a user can easily start using the services even with a mobile communication terminal, by inputting less information and making quasi-member registration.

However, according to the above-described conventional technique, since the quasi-members are subject to the certain restrictions on use of the services, there can be some cases where a user is unable to immediately receive a target service.

An object of the present invention is, in a service provision system that requires member registration when a service is used, to enable use of the service to be immediately started when a need for use of the service arises.

SUMMARY OF THE INVENTION

An aspect of the present invention is a service provision system that provides a service to a user, including: a first terminal apparatus deployed in a first site where member registration processing for the user is performed; a second terminal apparatus deployed in a second site where the member registration processing is performed; a registration request acquisition section that acquires a member registration request from the user; a position identification section that identifies a position of the user at a time when the member registration request is made; and a request transmission section that transmits the member registration request to the first terminal apparatus or the second terminal apparatus, wherein the request transmission section transmits the member registration request to the first terminal apparatus when the position of the user identified by the position identification section is not within an extent of a specified area that includes a predetermined area related to provision of the service and that is a range of a predetermined distance from the predetermined area, and transmits the member registration request to the second terminal apparatus when the position of the user identified by the position identification section is within the extent of the specified area.

According to another aspect of the present invention, the registration request acquisition section, the position identification section, and the request transmission section are included in a server, the registration request acquisition section acquires a member registration request by receiving the member registration request transmitted from a mobile communication terminal of the user, the position identification section identifies a position of the mobile communication terminal at a time when the member registration request is transmitted, as the position of the user at the time when the member registration request is made, and the request transmission section transmits the member registration request received from the mobile communication terminal to the first terminal apparatus when the position of the mobile communication terminal identified by the position identification section is not within the extent of the specified area, and transmits the member registration request received from the mobile communication terminal to the second terminal apparatus when the position of the mobile communication terminal identified by the position identification section is within the extent of the specified area.

According to another aspect of the present invention, the server includes a number-of-unprocessed-items acquisition section that acquires the number of unprocessed items that is the number of unprocessed member registration requests accumulated in the second site, and when the position of the mobile communication terminal is within the extent of the specified area, and when the number of unprocessed items acquired by the number-of-unprocessed-items acquisition section exceeds a predetermined number, the request transmission section transmits, to the mobile communication terminal of the user, an immediate-registration rejection notification indicating that the member registration processing cannot be completed within a predetermined time period.

According to another aspect of the present invention, the server includes a registration information management section that manages member registration information on the user who is registered as a member, and when the request transmission section transmits the immediate-registration rejection notification to the mobile communication terminal, the registration information management section adds information on an electronic coupon equivalent to a cash voucher or a discount voucher to the member registration information corresponding to the user of the mobile communication terminal.

According to another aspect of the present invention, the specified area includes a wireless relay apparatus that has the specified area as a communicable range, and when the member registration request transmitted from the mobile communication terminal comes via the wireless relay apparatus, the position identification section identifies a position of the wireless relay apparatus as the position of the mobile communication terminal that has transmitted the member registration request.

According to another aspect of the present invention, the service is a car-sharing service of renting a vehicle to the user, the predetermined area is a parking area for one or more rental vehicles, the server includes a vehicle allocation section that allocates one of the one or more rental vehicles to the user for which member registration is completed, and when the position of the mobile communication terminal is within the extent of the specified area, and when processing of the member registration request forwarded to the second terminal apparatus is completed, the vehicle allocation section transmits, to the mobile communication terminal of the user, proposal information indicating that among the one or more rental vehicles parked in the predetermined area, the rental vehicle located nearest to the position of the mobile communication terminal is a candidate vehicle for rent.

According to another aspect of the present invention, the registration request acquisition section, the position identification section, and the request transmission section are included in a mobile communication terminal used by the user, the registration request acquisition section acquires a member registration request that is inputted by the user into the mobile communication terminal, the position identification section identifies a position of the mobile communication terminal at a time when the user inputs the member registration request, as the position of the user at the time when the member registration request is made, and the request transmission section transmits the member registration request to the first terminal apparatus when the position of the mobile communication terminal identified by the position identification section is not within the extent of the specified area, and transmits the member registration request to the second terminal apparatus when the position of the mobile communication terminal identified by the position identification section is within the extent of the specified area.

According to another aspect of the present invention, a processing time period for the member registration processing in the second site is shorter than the processing time period in the first site.

Still another aspect of the present invention is a computer-readable storage medium storing a program for causing a mobile communication terminal used by a user in making member registration required when the user is provided with a service, to function as: a registration request acquisition section that acquires a member registration request inputted by the user; a position identification section that identifies a position of the mobile communication terminal, at a time when the user inputs the member registration request; and a request transmission section that transmits the member registration request, wherein the request transmission section is configured to transmit the member registration request to a first terminal apparatus when the position of the mobile communication terminal identified by the position identification section is not within an extent of a specified area that includes a predetermined area related to provision of the service and that is a range of a predetermined distance from the predetermined area, the first terminal apparatus deployed in a first site where member registration processing for the user is performed, and transmit the member registration request to a second terminal apparatus when the position of the mobile communication terminal identified by the position identification section is within the extent of the specified area, the second terminal apparatus deployed in a second site where the member registration processing is performed.

According to the aspects of the present invention, in a service provision system that requires member registration when a service is used, a user can immediately start using the service when a need for use of the service arises.

DETAILED DESCRIPTION OF THE PREFERRED EMBODIMENTS

Hereinafter, embodiments of the present invention will be described with reference to drawings.

First Embodiment

Figure 1:
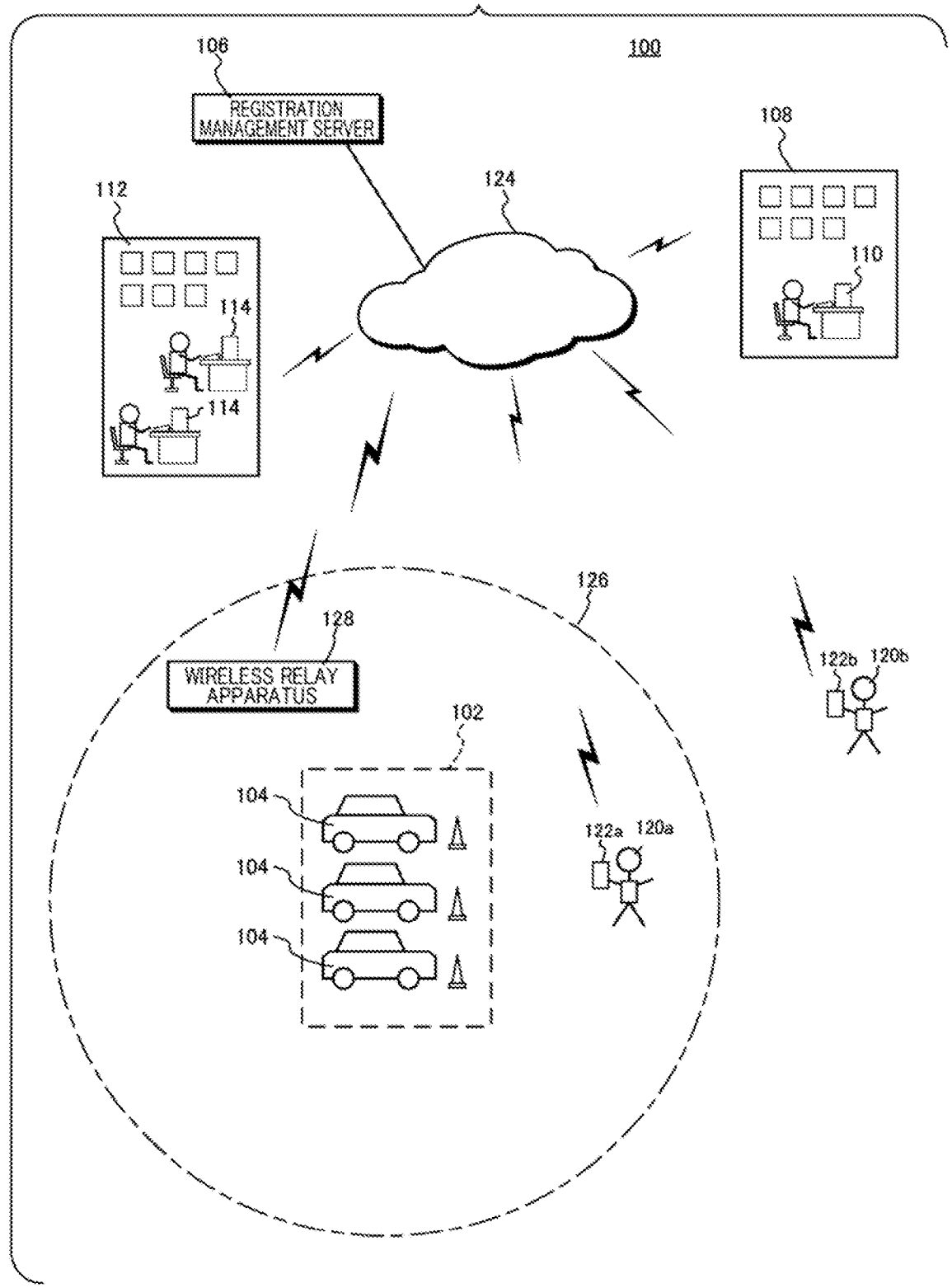
FIG. 1 shows a configuration of a service provision system according to a first embodiment of the present invention.

First, a first embodiment of the present invention will be described. FIG. 1 shows a configuration of a service provision system according to the first embodiment of the present invention. The service provision system 100 performs a car-sharing service. The service provision system 100 rents a rental vehicle (shared car) 104 to a user in a parking area 102 as a predetermined area related to the service provided by the service provision system 100. Prior to use of the rental vehicle 104, the user needs to make member registration.

The service provision system 100 includes a registration management server 106, a first terminal apparatus 110 that is a first terminal apparatus deployed in a first site 108 that is a first site where member registration processing is performed, and a second terminal apparatus 114 that is a second terminal apparatus deployed in a second site 112 that is a second site where the member registration processing is performed.

Here, the member registration processing performed in the first site 108 and the second site 112 can include, for example, confirmation work of manually confirming validity of a driver's license of a user who desires to use a rental vehicle 104. In the present embodiment, a processing time period for the member registration processing in the second site 112 is shorter than that in the first site 108, for a reason that, for example, the number of personnel who perform the confirmation work in the second site 112 is larger than that in the first site 108, or a reason that, for example, personnel who perform the confirmation work are constantly stationed in the second site 112 outside working hours of the first site 108, or the like.

The registration management server 106 acquires member registration requests from mobile communication terminals 122a, 122b that are respective communication terminals of users 120a, 120b. Here, the registration management server 106 is communicably connected to each of the first terminal apparatus 110, the second terminal apparatus 114, and the mobile communication terminals 122a, 122b of the users 120a, 120b through a communication network 124 including, for example, the Internet and the like. Hereinafter, the users 120a, 120b are also collectively referred to as user 120, and the mobile communication terminals 122a, 122b are also collectively referred to as mobile communication terminal 122.

The registration management server 106 transmits each of the acquired member registration requests to the first terminal apparatus 110 in the first site 108 or the second terminal apparatus 114 in the second site 112, depending on respective positions of the mobile communication terminals 122a, 122b of the users 120a, 120b at times when the member registration requests are transmitted.

Specifically, the registration management server 106 transmits the member registration request transmitted from the mobile communication terminal 122a located in a specified area 126, which includes the parking area 102 (that is, the predetermined area related to the service) and is a range of a predetermined distance from the parking area 102, to the second terminal apparatus 114 in the second site 112. On the other hand, the registration management server 106 transmits the member registration request transmitted from the mobile communication terminal 122b located outside the specified area 126 to the first terminal apparatus 110 in the first site 108.

Generally, a user who desires to immediately use the service is present near the predetermined area related to the service in many cases. This is because the user cannot immediately use the service if the user is far apart from the predetermined area. On the other hand, a user who can make member registration with some time to spare when using the service, in many cases, makes member registration from a place apart from the predetermined area related to the service, such as home of the user.

In the service provision system 100, when a position of a mobile communication terminal 122 that transmits a member registration request is within the range of the predetermined distance from the predetermined area related to the service, that is, within the specified area 126 including the parking area 102, then, as described above, the received member registration request is transmitted to the second terminal apparatus 114 in the second site 112 where the processing time period for the member registration processing is shorter. Accordingly, for example, a user 120 who desires to go unscheduled additional sightseeing by using a car-sharing service at a destination of a journey or the like can immediately use a rental vehicle 104 if the user 120 transmits a member registration request from the mobile communication terminal 122 in a vicinity of the parking area 102 for the rental vehicle 104.

In the service provision system 100, when a position of a mobile communication terminal 122 that transmits a member registration request is outside the range of the predetermined distance from the predetermined area related to the service (that is, the specified area 126), the received member registration request is transmitted to the first terminal apparatus 110 in the first site 108, which is different from the second site 112. In other words, in the service provision system 100, with respect to a user 120 who can make member registration in advance with time to spare when using the car-sharing service, the member registration processing for the user 120 is performed in the first site 108. Thus, in the service provision system 100, the member registration processing for a user 120 who desires to immediately use the service can be promptly performed in the second site 112, while work of processing member registration requests is prevented from being concentrated in the second site 122.

Note that when transmitting a member registration request, each mobile communication terminal 122 may be configured to transmit information on a current position of the mobile communication terminal 122 in addition to the member registration request. Thus, the registration management server 106 can determine, based on the current position information received together with the member registration request, whether or not a mobile communication terminal 122 that has transmitted the member registration request is within the specified area 126.

The specified area 126 may include a wireless relay apparatus 128 that has the specified area 126 as a communicable range and that relays communication of the mobile communication terminals 122. In such a case, for example, from a header of a communication packet carrying a member registration request (when a member registration request is communicated as a mail, a mail header of the mail), the registration management server 106 can check whether or not the member registration request comes via the wireless relay apparatus 128 and, when the member registration request comes via the wireless relay apparatus 128, can determine that a mobile communication terminal 122 that has transmitted the member registration request is within the specified area 126. The wireless relay apparatus 128 may be, for example, a Wi-Fi® router.

In addition to the above-described processing, the registration management server 106 may be configured to perform additional processing as described below.

Firstly, the registration management server 106 may acquire, from the second terminal apparatus 114, the number of unprocessed items that is the number of unprocessed member registration requests accumulated in the second site 112. When the position of the mobile communication terminal 122 that has transmitted the member registration request is within the specified area 126, and when the number of unprocessed items exceeds a predetermined number, the registration management server 106 can transmit, to the mobile communication terminal 122, an immediate-registration rejection notification indicating that registration processing cannot be performed within a predetermined time period. Thus, the user 120 can promptly consider, for example, another way of moving without using the car-sharing service, use of another car-sharing service provider, and the like.

Secondly, when the immediate-registration rejection notification is transmitted to the mobile communication terminal 122 of the user 120 as described above, the registration management server 106 may be configured to give the user 120 an electronic coupon equivalent to a cash voucher, a discount voucher, or the like. Thus, even when immediate provision of the service fails due to concentration of member registration requests, the user 120 can be motivated to make next use.

Thirdly, when processing of the member registration request received from the mobile communication terminal 122 located within the specified area 126 is completed by the second terminal apparatus 114 in the second site 112, the registration management server 106 may be configured to transmit, to the mobile communication terminal 122, proposal information indicating that a rental vehicle 104 located nearest to the mobile communication terminal 122 is a candidate vehicle for rent. Generally, when a user desires to immediately use a rental vehicle, it is presumed that, in many cases, the user makes a member registration request in a vicinity of the rental vehicle the user desires to rent. The transmission of the proposal information as described above may allow the user to immediately rent the desired vehicle only by making an affirmative response to the proposal information, without further transmitting information on a vehicle the user desires to rent after the member registration processing.

Figure 2:
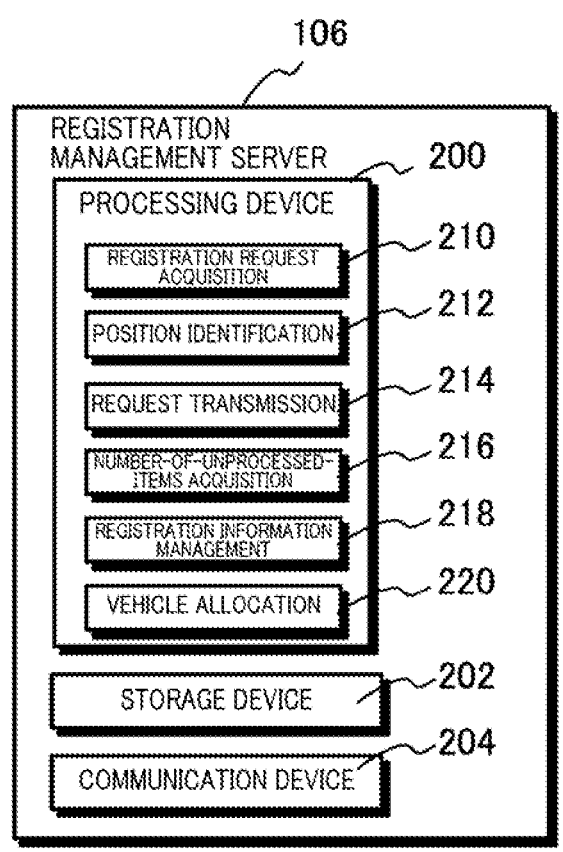
FIG. 2 shows a configuration of a registration management server included in the service provision system shown in FIG. 1.

FIG. 2 shows an example of a configuration of the registration management server 106 shown in FIG. 1. The registration management server 106 includes a processing device 200, a storage device 202, and a communication device 204. The storage device 202 includes, for example, a volatile or non-volatile semiconductor memory and/or a hard disk device or the like. The communication device 204 is a wired communication device and/or a wireless communication device for communicating with the mobile communication terminals 122 and the wireless relay apparatus 128 through the communication network 124.

The processing device 200 is, for example, a computer including a processor such as a CPU. The processing device 200 may include a ROM on which a program is written, a RAM for temporarily storing data, and the like. The processing device 200 includes, as functional elements or functional units, a registration request acquisition section 210, a position identification section 212, a request transmission section 214, a number-of-unprocessed-items acquisition section 216, a registration information management section 218, and a vehicle allocation section 220.

The functional elements included in the processing device 200 are implemented, for example, in such a manner that the processing device 200 that is a computer executes a program. Note that the computer program can be stored in an arbitrary computer-readable storage medium. Instead, each of all, or one or some, of the functional elements included in the processing device 200 can also be configured by using hardware including one or more electronic circuit components.

The registration request acquisition section 210 acquires a member registration request from a user 120. In the present embodiment, the registration request acquisition section 210 acquires the member registration request by receiving the member registration request transmitted from the mobile communication terminal 122 of the user 120 through the communication network 124.

For example, the registration request acquisition section 210 stores, in the storage device 202, a member registration request record including information on the received member registration request. At the time, when position information about a current position of the mobile communication terminal 122 is added to the member registration request received from the mobile communication terminal 122, the registration request acquisition section 210 may be configured to add the position information to the member registration request record in association with the member registration request. The member registration request record may include access information required for communication (for example, a mail address or the like required for communication) with the corresponding mobile communication terminal 122.

The position identification section 212 identifies a position of the user at a time when the member registration request is made. In the present embodiment, the position identification section 212 identifies a position of the mobile communication terminal 122 at a time when the member registration request is transmitted, as the position of the user 120 at the time when the member registration request is made. Specifically, the position identification section 212 identifies the current position of the mobile communication terminal, for example, from the position information stored in association with the member registration request in the storage device 202.

When the member registration request transmitted from the mobile communication terminal 122 is received via the wireless relay apparatus 123 that has the specified area 126 as a communicable range as described above, a position of the wireless relay apparatus 128 can be identified as the current position of the mobile communication terminal 122. As described above, whether or not a member registration request comes via the wireless relay apparatus 128 can be identified, for example, from the header of a communication packet carrying the member registration request (when the member registration request is communicated as a mail, the mail header of the mail). For example, the position of the wireless relay apparatus 128 may be stored in the storage device 202 beforehand in association with an identification ID (for example, a MAC address) of the wireless relay apparatus 128.

The request transmission section 214 forwards the member registration request acquired by the registration request acquisition section 210 to the first terminal apparatus 110 in the first site 108 or the second terminal apparatus 114 in the second site 112, depending on the current position, identified by the position identification section 212, of the mobile communication terminal 122 that is a source of the member registration request. The forwarding may be performed by vising the communication device 204 through the communication network 124.

Specifically, when the current position of the mobile communication terminal 122 identified by the position identification section 212 is not within the extent of the specified area 126, the request transmission section 214 forwards the member registration request received from the mobile communication terminal 122 to the first terminal apparatus 110 in the first site 108. When the current position of the mobile communication terminal 122 identified by the position identification section 212 is within the extent of the specified area 126, the request transmission section 214 forwards the member registration request received from the mobile communication terminal 122 to the second terminal apparatus 114 in the second site 112.

Note that when a plurality of first terminal apparatuses 110 and/or a plurality of second terminal apparatuses 114 exist, each of the first terminal apparatuses 110 and/or each of the second terminal apparatuses 114 is configured to prevent occurrence of processing conflict on the same member registration request received from the registration management server 106, according to a conventional technique. Such prevention of processing conflict may be performed, for example, in such a manner that a terminal apparatus used for a first processing of a member registration request gives each other terminal apparatus an instruction for prohibiting processing of the member registration request.

Instead, the registration management server 106 may be configured to forward a member registration request to a first terminal apparatus 10 or a second terminal apparatus 114 via a server (not shown) deployed in the first site 108 or a server (not shown) deployed in the second site 112, respectively. In such a case, for example, each of the servers may be configured to store the member registration request received from the registration management server 106. For example, each member registration information stored in the server in the second site 112 may be configured to be deleted from the server or marked with an "under processing" or "processed" flag after the member registration information is read by any one of the second terminal apparatuses 114, whereby processing conflict between the plurality of second terminal apparatuses 114 can be prevented.

When a member registration request is received from a mobile communication terminal 122 whose current position is within the extent of the specified area 126, and when the number of unprocessed items in the second site 112 acquired by the number-of-unprocessed-items acquisition section 216, which will be described below, exceeds the predetermined number, the request transmission section 214 transmits, to the mobile communication terminal 122, an immediate-registration rejection notification indicating that member registration processing cannot be completed within the predetermined time period.

The number-of-unprocessed-items acquisition section 216 acquires the number of unprocessed items that is the number of unprocessed member registration requests accumulated in the second site 112. Specifically, the number-of-unprocessed-items acquisition section 216 may be configured to acquire the number of unprocessed items in the second site 112, for example, from the second terminal apparatus 114 or, if a server as described above is deployed in the second site 112, from the server.

The registration information management section 218 manages member registration information on a user 120 who is registered as a member. When the request transmission section 214 transmits an immediate-registration rejection notification to a mobile communication terminal 122, the registration information management section 218 adds information on an electronic coupon equivalent to a cash voucher or a discount voucher to member registration information on the user 120 of the mobile communication terminal 122 that is a destination of the immediate-registration rejection notification. Here, the information on the electronic coupon may be, for example, information on the number of points for which a monetary value per point is defined.

The registration in format ion management section 218 adds the number of points as the above-described information on the electronic coupon to the member registration information, which includes, for example, a name, an address, a driver's license registration number, and the like of the user 120.

The vehicle allocation section 220 allocates a rental vehicle 104 to a user 120 for which member registration is completed. Particularly with respect to member registration related to a member registration request received from a mobile communication terminal 122 within the specified area 126, when the member registration processing by the second terminal apparatus 114 is completed, the vehicle allocation section 220 transmits, to the mobile communication terminal 122, proposal information indicating that a rental vehicle 104 located nearest to the mobile communication terminal 122 is a candidate vehicle for rent. For example, when the processing for the member registration is completed, the second terminal apparatus 114 may be configured to transmit, to the registration management server 106, a registration completion notification including information on the member registration request related to the completed member registration. The vehicle allocation section 220 can identify a position of the mobile communication terminal 122 that has transmitted the member registration request, by referring to the member registration request record stored in the storage device 202 based on the information on the member registration request included in the registration completion notification.

The proposal information transmitted by the vehicle allocation section 220 to the mobile communication terminal 122 may be in a questioning form such as "Do you accept  as a vehicle you will use" ("" can include a vehicle type, a license plate number, and the like of the candidate vehicle for rent), or may display a photograph of the candidate vehicle for rent (that is, the rental vehicle 104 located nearest to the mobile communication terminal 122) to the mobile communication terminal 122 to acquire a response of YES/NO.

The user 120 of the mobile communication terminal 122 that has received the proposal information from the vehicle allocation section 220 can transmit, from the mobile communication terminal 122 to the registration management server 106, for example, a response indicating whether or not the user 120 will rent the candidate vehicle for rent indicated by the proposal information. When the response has a positive content indicating that the candidate vehicle for rent will be rented, the vehicle allocation section 220 allocates the rental vehicle 104 that is the candidate vehicle for rent to the user 120. Here, the response may be configured to include, for example, information such as a time of beginning of use and a time of ending of use of the candidate vehicle for rent, which are inputted by the user 120 into the mobile communication terminal 122.

Specifically, for example, the vehicle allocation section 220 may be configured to allocate the rental vehicle 104 to the user 120 by transmitting, to another dedicated server for vehicle allocation processing (not shown), information indicating to allocate the rental vehicle 104 corresponding to the candidate vehicle for rent to the user 120, together with the information such as the time of beginning of use and the time of ending of use. The dedicated server for vehicle allocation processing can allow the user 120 to use the rental vehicle 104, according to a conventional technique, for example, by transmitting an electronic key for using the allocation-target rental vehicle 104 to the mobile communication terminal 122 of the user 120.

Figure 3:
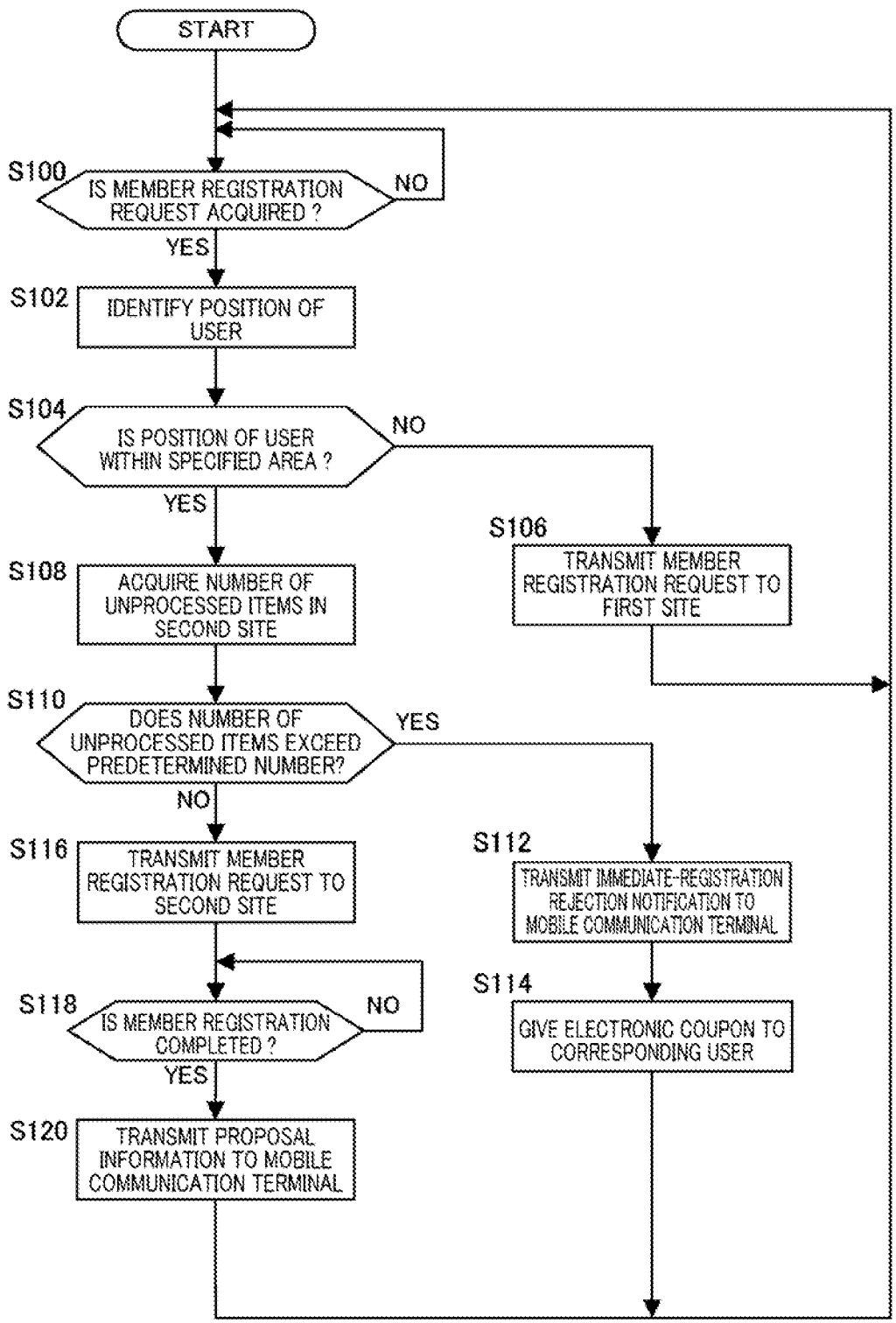
FIG. 3 is a flowchart showing a procedure of operations of the registration management server shown in FIGS. 1 and 2.

Next, operation of the registration management server 106 in the service provision system 100 will be described. FIG. 3 is a flowchart showing a procedure of processing in the registration management server 106. The processing is started when a power supply of the registration management server 106 is turned on, and is terminated when the power supply is turned off.

When the processing is started, the registration request acquisition section 210 of the registration management server 106 determines whether or not a member registration request from a user 120 is acquired (S100). In the present embodiment, a member registration request is acquired by being received from a mobile communication terminal 122 of a user 120. When a member registration request is not acquired (S100, NO), the registration request acquisition section 210 returns to step S100 and waits to acquire a member registration request.

When a member registration request is acquired (S100, YES), the position identification section 212 identifies a position of the user 120 that is a source of the acquired member registration request (S102). In the present embodiment, the position of the user 120 is identified as a current position of the mobile communication terminal 122 that is the source of the member registration request, as described above.

Subsequently, the request transmission section 214 determines whether or not the position of the user 120 identified by the position identification section 212 is within the extent, of the specified area 126 (S104). When the position of the user 120 is not within the extent of the specified area 126 (S104, NO), the request transmission section 214 transmits the member registration request to the first terminal apparatus 110 in the first site 108 (S106), and thereafter the processing returns to step S100.

When the position of the user 120 is within the extent of the specified area 126 (S104, YES), the number-of-unprocessed-items acquisition section 216 acquires, for example, from the second terminal apparatus 114, the number of unprocessed items that is the number of unprocessed member registration requests accumulated in the second site 112 (S108).

Subsequently, the request transmission section 214 determines whether or not the number of unprocessed items acquired by the number-of-unprocessed-items acquisition section 216 exceeds the predetermined number (S110). When the number of unprocessed items exceeds the predetermined number (S110, YES), the request transmission section 214 transmits an immediate-registration rejection notification to the mobile communication terminal 122 of the user 120 that is the source of the member registration request most recently transmitted to the second terminal apparatus 114 (S112). Subsequently, the registration information management section 218 gives an electronic coupon to the user 120 of the mobile communication terminal 122 (S114), and thereafter the processing returns to step S100.

When the number of unprocessed items does not exceed the predetermined number (S110, NO), the request transmission section 214 transmits the member registration request to the second terminal apparatus 114 in the second site 112 (S116). Subsequently, the vehicle allocation section 220 determines whether or not there is any member registration request for which member registration is completed in the second site 112 (S118). As described above, the vehicle allocation section 220 can determine whether or not there is any member registration request for which member registration is completed in the second site 112, based, on a registration completion notification received from the second terminal apparatus 114.

When there is no member registration request for which member registration is completed (S118, NO), the vehicle allocation section 220 returns to step S118, and waits for member registration for any member registration request to be completed in the second site 112. When there is a member registration request for which member registration is completed (S118, YES), the vehicle allocation section 220 transmits proposal information to the mobile communication terminal 122 related to the member registration request for which member registration is completed (S120), and thereafter the processing returns to step S100. Here, as described above, the proposal, information may be information that proposes, as a candidate vehicle for rent, a rental vehicle 104 located nearest to the position of the mobile communication terminal 122 related to the member registration request for which member registration is completed, among rental vehicles 104 parked in the parking area 102.

Note that when a response to the proposal information is received from the mobile communication terminal 122 of the user 120, the vehicle allocation section 220 may be configured to perform processing for allocating the candidate vehicle for rent to the user 120, in parallel with the above-described processing. Of the processing shown in FIG. 3, the processing in steps S118 and S120 may be configured to be performed as separate processing from the processing in FIG. 3 by the vehicle allocation section 220, in parallel with the processing in FIG. 3. The separate processing can be started, for example, when the registration management server 106 receives a registration completion notification from the second terminal apparatus 114.

Second Embodiment

Next, a second embodiment of the present invention will be described. In the service provision system 100 according to the first embodiment shown in FIG. 1, the registration request acquisition section, the position identification section, and the request transmission section are included in the registration management server 106 as the registration request acquisition section 210, the position identification section 212, and the request transmission section 214, respectively, but such a configuration does not impose a limitation. The registration request acquisition section, the position identification section, and the request transmission section may be implemented as constituent elements of a mobile communication terminal used by a user 120.

Figure 4:
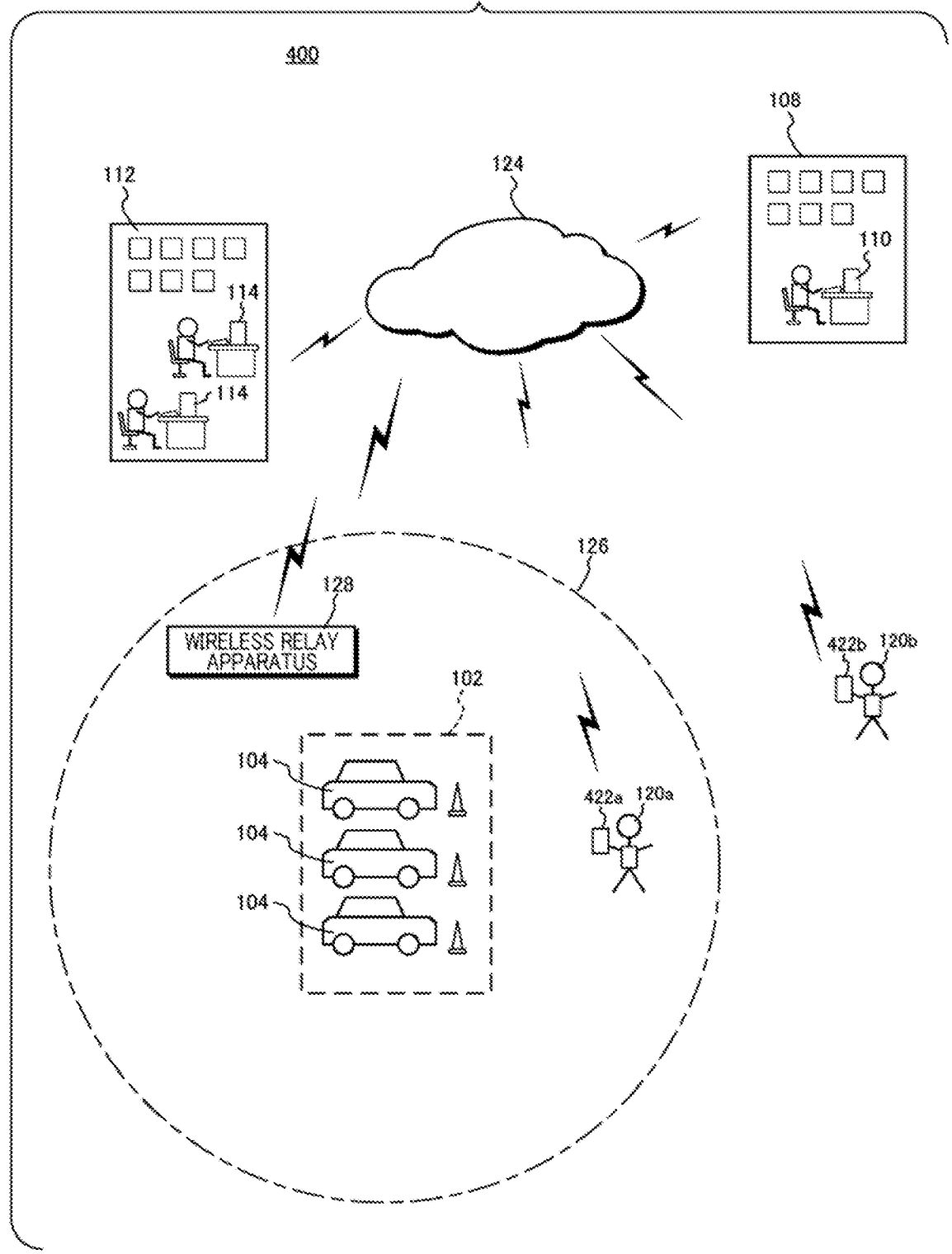
FIG. 4 shows a configuration of a service provision system according to a second embodiment of the present invention.

FIG. 4 shows a configuration of a service provision system according to the second embodiment of the present invention. In the service provision system 400, the registration request acquisition section, the position identification section, and the request transmission section are implemented as constituent elements of each of respective mobile communication terminals 422a, 422b of users 120a, 120b. Hereinafter, the mobile communication terminals 422a, 422b are also collectively referred to as mobile communication terminal 422. Note that for constituent elements in FIG. 4 that are identical to the constituent elements shown in FIG. 1, the same reference signs as the reference signs in FIG. 1 are used, and the above description related to FIG. 1 is quoted.

The service provision system 400 has a configuration similar to the configuration of the service provision system 100, but does not include the registration management server 106 and includes the mobile communication terminal 422 of each user 120 as a constituent element. The mobile communication terminal 422 acquires a member registration request inputted by the user 120 into the mobile communication terminal 422 and transmits the acquired member registration request to the first terminal apparatus 110 in the first site 108 or the second terminal apparatus 114 in the second site 112, depending on a current position of the mobile communication terminal 422.

Specifically, similarly to the registration management server 106 in the service provision system 100 according to the first embodiment, the mobile communication terminal 422 transmits the member registration request to the first terminal apparatus 110 in the first site 108 when the position of the mobile communication terminal 422 is not within the extent of the specified area 126. When the position of the mobile communication terminal 422 is within the extent of the specified area 126, the mobile communication terminal 422 transmits the member registration request to the second terminal apparatus 114 in the second site 112.

Thus, in the service provision system 400, as in the service provision system 100 according to the first embodiment, member registration processing for a user 120 who desires to immediately use the service can be promptly performed in the second site 112, while work of processing member registration requests is prevented from being concentrated in the second site 112.

Figure 5:
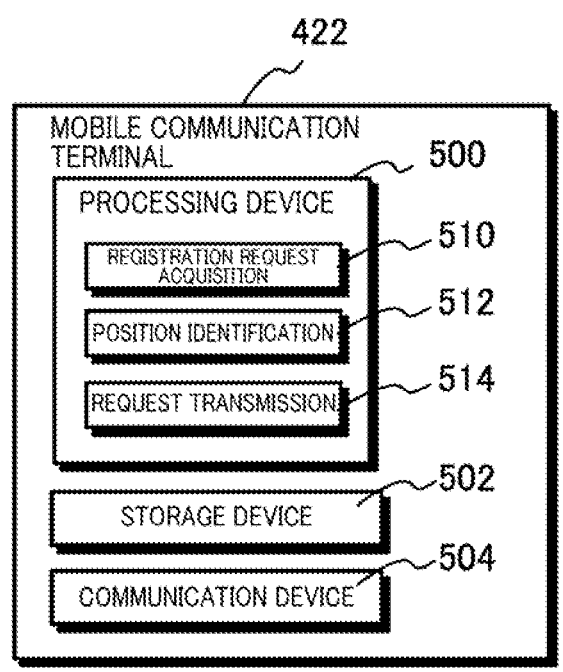
FIG. 5 shows a configuration of a mobile communication terminal included in the service provision system shown in FIG. 4.

FIG. 5 shows an example of a configuration of the mobile communication terminal 422 included in the service provision system 400. The mobile communication terminal 422 is a mobile communication terminal used to make member registration required when a user 120 is provided with the service, and includes a processing device 500, a storage device 502, and a communication device 504.

The storage device 502 includes, for example, a volatile or non-volatile semiconductor memory and the like. The communication device 504 is a wireless communication device for communicating with the first terminal apparatus 110 and the second terminal apparatus 114 through the communication network 124 (or the wireless relay apparatus 128 and the communication network 124).

The processing device 500 is, for example, a computer including a processor such as a CPU. The processing device 500 may include a ROM on which a program is written, a RAM for temporarily storing data, and the like. The processing device 500 includes, as functional elements or functional units, a registration request acquisition section 510, a position identification section 512, and a request transmission section 514.

The functional elements included in the processing device 500 are implemented, for example, in such a manner that the processing device 500 that is a computer executes a program. Note that the computer program can be stored in an arbitrary computer-readable storage medium. Instead, each of all, or one or some, of the functional elements included in the processing device 500 can also be configured by using hardware including one or more electronic circuit components.

The registration request acquisition section 510, similarly to the registration request acquisition section 210 of the registration management server 106 according to the first embodiment, acquires a member registration request from a user 120. Specifically, unlike the registration request acquisition section 210, the registration request acquisition section 510 acquires the member registration request that is inputted by the user 120 into the mobile communication terminal 422. The user 120 may input the member registration request, for example, by using a touch panel (not shown) included in the mobile communication terminal 422.

The position identification section 512, similarly to the position identification section 212 according to the first embodiment, identifies a position of the user 120 at a time when the member registration request is made. Specifically, the position identification section 512 identifies a position of the mobile communication terminal 422 at a time when the user 120 inputs the member registration request, as the position of the user 120 at the time when the member registration request is made. Note that the position of the mobile communication terminal 422 can be detected, for example, by using a GPS radio-wave receiver (not shown) included in the mobile communication terminal 422.

The request transmission section 514, similarly to the request transmission section 214 according to the first embodiment, transmits the member registration request to the first terminal apparatus 110 in the first site 108 or the second terminal apparatus 114 in the second site 112. Specifically, when the position of the mobile communication terminal 422 identified by the position identification section 512 is not within the extent of the specified area 126, the request transmission section 514 transmits the member registration request acquired by the registration request acquisition section 510 to the first terminal apparatus 110. When the position of the mobile communication terminal 422 identified by the position identification section 512 is within the extent of the specified area 126, the request transmission section 514 transmits the member registration request to the second terminal apparatus 114.

Note that the present invention is not limited to the configurations according to the above-described embodiments, but can be carried out in various aspects within a scope that does not depart from the gist of the invention.

For example, although the service provision systems 100, 400 provide the car-sharing service in the above-described embodiments, a service is not limited to the car-sharing service. The service provision systems 100, 400 may provide any service that requires member registration of a user when the service is provided.

Although FIGS. 1 and 4 show the two users 120a, 120b and the two mobile communication terminals 122a, 122b or 422a, 422b used by the users 120a, 120b, respectively, in the above-described embodiments, the numbers of users and mobile communication terminals are not limited to two. The mobile communication terminals 122 handled in the service provision system 100 or the mobile communication terminals 422 included in the service provision system 400 may be any number of mobile communication terminals used by the any number of users 120, respectively.

Although the one parking area 102 (that is, one predetermined area related to provision of the service), the one first site 108, and the one second site 112 are assumed in the above-described embodiments, the numbers of parking areas, first sites, and second sites are not limited to one. There may be any numbers of predetermined areas related to provision of the service, first sites 108, and second sites 112. For example, one second site 112 may be provided correspondingly to each of predetermined areas related to provision of the service.

As described above, the service provision systems 100, 400 according to the above-described embodiments provide a service to a user 120. The service provision systems 100, 400 include the first terminal apparatus 110 deployed in the first site 108 where member registration processing for the user 120 is performed, and the second terminal apparatus 114 deployed in the second site 112 where the member registration processing is performed. The service provision systems 100, 400 respectively include the registration request acquisition sections 210, 510 that acquire a member registration request from the user 120, the position identification sections 212, 512 that identify a position of the user 120 at a time when the member registration request is made, and the request transmission sections 214, 514 that transmit the member registration request to the first terminal apparatus 110 or the second terminal apparatus 114. The request transmission sections 214, 514 transmit the member registration request to the first terminal apparatus 110 when the position of the user 120 identified by the position identification sections 212, 512 is not within the extent of the specified area 126 that includes a predetermined area related to provision of the service, which is, for example, the parking area 102, and that is a range of a predetermined distance from the predetermined area. The request transmission sections 214, 514 transmit the member registration request to the second terminal apparatus 114 when the position of the user 120 identified by the position identification sections 212, 512 is within the extent of the specified area 126.

According to such a configuration, in the service provision systems 100, 400 that require member registration when the service is used, a user 120 can promptly start using the service upon making member registration immediately when a need for use of the service arises.

In the service provision system 100 according to the above-described first embodiment, the registration request acquisition section, the position identification section, and the request transmission section are included in the registration management server 106 as the registration request acquisition section 210, the position identification section 212, and the request transmission section 214, respectively. Here, the registration request acquisition section 210 acquires a member registration request by receiving the member registration request transmitted from a mobile communication terminal 122 of a user 120. The position identification section 212 identifies a position of the mobile communication terminal 122 at a time when the member registration request is transmitted, as the position of the user 120 at the time when the member registration request is made. When the position of the mobile communication terminal 122 identified by the position identification section 212 is not within the extent of the specified area 126, the request transmission section 214 transmits the member registration request received from the mobile communication terminal 122 to the first terminal apparatus 110. When the position of the mobile communication terminal 122 identified by the position identification section 212 is within the extent of the specified area 126, the request transmission section 214 transmits the member registration request received from the mobile communication terminal 122 to the second terminal apparatus 114.

According to such a configuration, since forwarding of the member registration request of the user 120 is performed in a supervised manner by the registration management server 106, additional processing related to member registration, such as giving of a coupon and keeping track of expected completion of member registration, can be performed or instructed by the registration management server 106.

In the service provision system 100, the registration management server 106 includes the number-of-unprocessed-items acquisition section 216 that acquires the number of unprocessed items that is the number of unprocessed member registration requests accumulated in the second site 112. When the position of the mobile communication terminal 122 is within the extent of the specified area 126, and when the number of unprocessed items acquired by the number-of-unprocessed-items acquisition section 216 exceeds a predetermined number, the request transmission section 214 of the registration management server 106 transmits, to the mobile communication terminal 122 of the user 120, an immediate-registration rejection notification indicating that the member registration processing cannot be completed within a predetermined time period.

According to such a configuration, when a member registration request cannot be immediately processed, since a notification to that effect is made to the user 120, the user 120 is not made to wait longer than necessary until member registration is completed. Accordingly, convenience of the service provision system 100 to the user 120 is enhanced.

In the service provision system 100, the registration management server 106 includes the registration information management section 218 that manages member registration information on a user who is registered as a member. When the request transmission section 214 transmits the immediate-registration rejection notification to the mobile communication terminal 122, the registration information management section 218 adds information on an electronic coupon equivalent to a cash voucher or a discount voucher to the member registration information corresponding to the user 120 of the mobile communication terminal 122. According to such a configuration, since monetary compensation for unavailability of immediately starting use of the service is provided to the user 120, dissatisfaction of the user 120 can be mitigated.

In the service provision system 100, the specified area 126 includes the wireless relay apparatus 128 that has the specified area 126 as a communicable range. When the member registration request transmitted from the mobile communication terminal 122 comes via the wireless relay apparatus 128, the position identification section 212 of the registration management server 106 identifies a position of the wireless relay apparatus 128 as the position of the mobile communication terminal 122 that has transmitted the member registration request. According to such a configuration, the position of the user who makes the member registration request can be easily identified, and a site to which the member registration request is to be transmitted can be immediately determined.

The service performed by the service provision system 100 is the car-sharing service of renting a rental vehicle 104 to a user 120. The predetermined area related to provision of the service is the parking area 102 for rental vehicles 104. The registration management server 106 includes the vehicle allocation section 220 that allocates a rental vehicle 104 to a user 120 for which member registration is completed. When the position of the mobile communication terminal 122 is within the extent of the specified area 126, and when processing of the member registration request forwarded to the second terminal apparatus 114 is completed, the vehicle allocation section 220 transmits, to the mobile communication terminal 122 of the user 120, proposal information indicating that among the rental vehicles 104 parked in the parking area 102, a rental vehicle 104 located nearest to the position of the mobile communication terminal 122 is a candidate vehicle for rent.

According to such a configuration, since the rental vehicle 104 with a high degree of probability that the user 120 desires to use is automatically proposed as a candidate vehicle for rent, convenience of the service provision system 100 to the user 120 can be enhanced.

In the service provision system 400 according to the second embodiment, the registration request acquisition section, the position identification section, and the request transmission section are included in each mobile communication terminal 422 used by a user 120 as the registration request acquisition section 510, the position identification section 512, and the request transmission section 514. The registration request acquisition section 510 acquires a member registration request inputted by the user 120 into the mobile communication terminal 422. The position identification section 512 identifies a position of the mobile communication terminal 422 at a time when the user 120 inputs the registration request, as the position of the user 120 at the time when the member registration request is made. The request transmission section 514 transmits the member registration request to the first terminal apparatus 110 when the position of the mobile communication terminal 422 identified by the position identification section 512 is not within the extent of the specified area 126. The request transmission section 514 transmits the member registration request to the second terminal apparatus 114 when the position of the mobile communication terminal 422 identified by the position identification section 512 is within the extent of the specified area 126.

According to such a configuration, since the registration management server 106 is eliminated, costs of the service provision system 400 can be reduced.

REFERENCE SIGNS LIST 100, 400 . . . service provision system, 102 . . . parking area, 104 . . . rental vehicle, 106 . . . registration management server, 106 . . . first site, 110 . . . first terminal apparatus, 112 . . . second site, 114 . . . second terminal apparatus, 120, 120a, 120b . . . user, 122, 122a, 122b, 422, 422a, 422b . . . mobile communication terminal, 124 . . . communication network, 126 . . . specified area, 128 . . . wireless relay apparatus, 200, 500 . . . processing device, 202, 502 . . . storage device, 204, 504 . . . communication device, 210, 510 . . . registration request acquisition section, 212, 512 . . . position identification section, 214, 514 . . . request transmission section, 216 . . . number-of-unprocessed-items acquisition section, 218 . . . registration information management section, 220 . . . vehicle allocation section.

What is claimed is:

1. A service provision system that provides a service to a user, comprising:
    a first terminal apparatus deployed in a first site where member registration processing for the user is performed;
    a second terminal apparatus deployed in a second site where the member registration processing is performed; and
    a processor; the processor including:
    a registration request acquisition section that acquires a member registration request from the user;
    a position identification section that identifies a position of the user at a time when the member registration request is made; and
    a request transmission section that transmits the member registration request to the first terminal apparatus or the second terminal apparatus,
    wherein the request transmission section
        transmits the member registration request to the first terminal apparatus when the position of the user identified by the position identification section is not within an extent of a specified area that includes a predetermined area related to provision of the service and that is a range of a predetermined distance from the predetermined area, and
        transmits the member registration request to the second terminal apparatus when the position of the user identified by the position identification section is within the extent of the specified area.

2. The service provision system according to claim 1, wherein
    the processor including the registration request acquisition section, the position identification section, and the request transmission section is included in a server;
    the registration request acquisition section acquires the member registration request by receiving the member registration request transmitted from a mobile communication terminal of the user;
    the position identification section identifies a position of the mobile communication terminal at a time when the member registration request is transmitted, as the position of the user at the time when the member registration request is made; and
    the request transmission section
        transmits the member registration request received from the mobile communication terminal to the first terminal apparatus when the position of the mobile communication terminal identified by the position identification section is not within the extent of the specified area; and
        transmits the member registration request received from the mobile communication terminal to the second terminal apparatus when the position of the mobile communication terminal identified by the position identification section is within the extent of the specified area.

3. The service provision system according to claim 2, wherein
    the processor of the server includes a number-of-unprocessed-items acquisition section that acquires the number of unprocessed items that is the number of unprocessed member registration requests accumulated in the second site; and
    when the position of the mobile communication terminal is within the extent of the specified area, and when the number of unprocessed items acquired by the number-of-unprocessed-items acquisition section exceeds a predetermined number, the request transmission section transmits, to the mobile communication terminal of the user, an immediate-registration rejection notification indicating that the member registration processing cannot be completed within a predetermined time period.

4. The service provision system according to claim 3, wherein
    the processor of the server includes a registration information management section that manages member registration information on the user who is registered as a member; and
    when the request transmission section transmits the immediate-registration rejection notification to the mobile communication terminal, the registration information management section adds information on an electronic coupon equivalent to a cash voucher or a discount voucher to the member registration information corresponding to the user of the mobile communication terminal.

5. The service provision system according to claim 2, wherein
    the specified area includes a wireless relay apparatus that has the specified area as a communicable range; and
    when the member registration request transmitted from the mobile communication terminal comes via the wireless relay apparatus, the position identification section identifies a position of the wireless relay apparatus as the position of the mobile communication terminal that has transmitted the member registration request.

6. The service provision system according to claim 2, wherein
    the processor of the service is a car-sharing service of renting a vehicle to the user;
    the predetermined area is a parking area for one or more rental vehicles;

the server includes a vehicle allocation section that allocates one of the one or more rental vehicles to the user for which member registration is completed; and when the position of the mobile communication terminal is within the extent of the specified area, and when processing of the member registration request forwarded to the second terminal apparatus is completed, the vehicle allocation section transmits, to the mobile communication terminal of the user, proposal information indicating that among the one or more rental vehicles parked in the predetermined area, the rental vehicle located nearest to the position of the mobile communication terminal is a candidate vehicle for rent.

7. The service provision system according to claim 1, wherein the processor including the registration request acquisition section, the position identification section, and the request transmission section is included in a mobile communication terminal used by the user;

the registration request acquisition section acquires the member registration request that is inputted by the user into the mobile communication terminal;

the position identification section identifies a position of the mobile communication terminal at a time when the user inputs the member registration request, as the position of the user at the time when the member registration request is made; and the request transmission section transmits the member registration request to the first terminal apparatus when the position of the mobile communication terminal identified by the position identification section is not within the extent of the specified area; and transmits the member registration request to the second terminal apparatus when the position of the mobile communication terminal identified by the position identification section is within the extent of the specified area.

8. The service provision system according to claim 1, wherein a processing time period for the member registration processing in the second site is shorter than the processing time period in the first site.

9. A non-transitory computer-readable storage medium storing a program for causing a mobile communication terminal used by a user in making member registration required when the user is provided with a service, to function as:

a registration request acquisition section that acquires a member registration request inputted by the user;

a position identification section that identifies a position of the mobile communication terminal at a time when the user inputs the member registration request; and a request transmission section that transmits the member registration request, wherein the request transmission section is configured to transmit the member registration request to a first terminal apparatus when the position of the mobile communication terminal identified by the position identification section is not within an extent of a specified area that includes a predetermined area related to provision of the service and is a range of a predetermined distance from the predetermined area, the first terminal apparatus deployed in a first site where member registration processing for the user is performed; and transmit the member registration request to a second terminal apparatus when the position of the mobile communication terminal identified by the position identification section is within the extent of the specified area, the second terminal apparatus deployed in a second site where the member registration processing is performed.

* * * * *